United States Patent [19]

Ohtsuki et al.

[11] Patent Number: 4,695,914
[45] Date of Patent: Sep. 22, 1987

[54] ELECTRONIC CARD CONNECTING CIRCUIT

[75] Inventors: Tomonari Ohtsuki, Mooka; Kazuyoshi Tsurumaki, Minami-Saitama, both of Japan

[73] Assignee: Daiichi Denshi Kogyo Kabushiki Kaisha, Tokyo, Japan

[21] Appl. No.: 899,254

[22] Filed: Aug. 22, 1986

[30] Foreign Application Priority Data

Aug. 23, 1985 [JP] Japan .................. 60-128380[U]

[51] Int. Cl.[4] .............................................. H02H 9/08
[52] U.S. Cl. ...................................... 361/42; 235/441; 235/492; 361/1
[58] Field of Search .............. 235/441, 482, 492; 361/42–50, 1; 365/63, 226

[56] References Cited

U.S. PATENT DOCUMENTS 3,831,119  8/1974  Ambrosio ........................... 235/441
4,368,524  1/1983  Nakamura et al. ................. 365/226
4,558,309  12/1985 Antonevich ........................ 365/492
4,575,621  3/1986  Dreifus .............................. 361/42

Primary Examiner—A. D. Pellinen
Assistant Examiner—Jeffrey A. Gaffin
Attorney, Agent, or Firm—Silverman, Cass, Singer & Winburn, Ltd.

[57] ABSTRACT

An electronic card connecting circuit comprises a first contact pin for earthing a ground terminal of an electronic card, a second contact pin for electrically contacting the ground terminal to detect the ground terminal being earthed by the first contact pin, and detection control means including an active element which detects the second contact means being connected through the ground terminal to the first contact pin and controls a power source circuit to supply power to the electronic card. With this arrangement, when the first and second contact pins are in contact with the ground terminal of the electronic card, the detection control means detects the second contact pin being earthed to produce a control signal to apply power of source to the electronic card. In this manner, before the ground terminal of the card is earthed, the power source is prevented from being connected to the electronic card.

8 Claims, 4 Drawing Figures

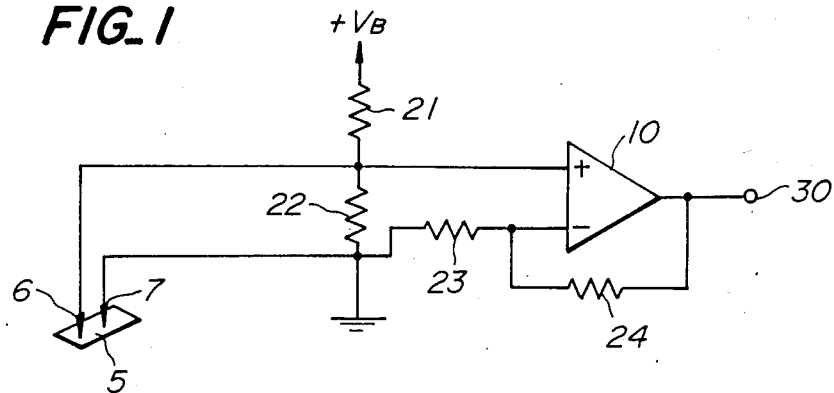
FIG_1
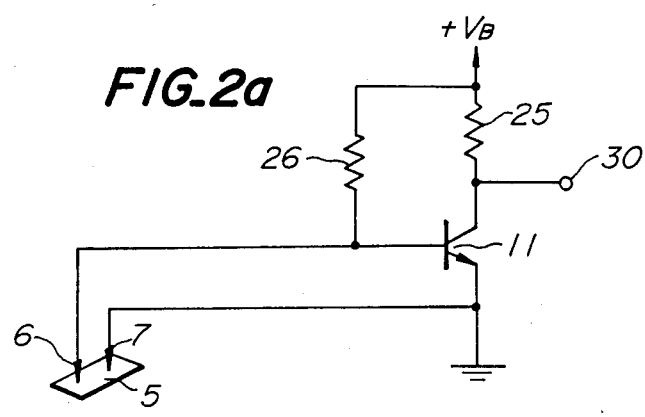
FIG_2a
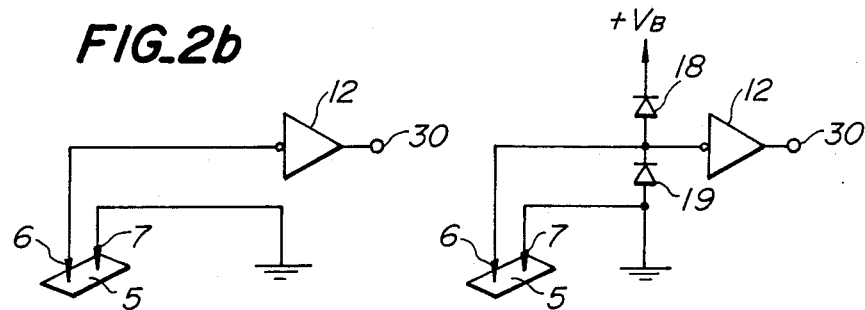
FIG_2b
FIG_2c

ELECTRONIC CARD CONNECTING CIRCUIT

BACKGROUND OF THE INVENTION

This invention relates to an electronic card connecting circuit for use in a receiving device for cards having electronic functions, and more particularly to a control for supplying power to an electronic card incorporating therein integrated circuits (which are referred to as "IC" hereinafter) to be inserted into an electronic card receiving device.

With the recent development of the IC technique, it has become possible to realize the IC on a large scale in a small chip. As a result, various kinds of such products having high degree functions have been developed and their applications have been widely extended.

For example, particular cards have been manufactured in which are embedded read-only memory (ROM) including programs written therein of microprocessors or the like and random access memory (RAM) capable of taking in and out data.

Moreover, electronic equipment incorporating microprocessors or the like therein have been miniaturized to pocketable sizes. With such miniaturized equipment, the requirement of using cards incorporating therein IC has been increased.

For example, there is a tendency for so-called "credit cards" or "cash cards" used in financial systems to incorporate therein IC. Therefore, it has been required to miniaturize the equipment using such electronic cards to pocketable sizes.

In case of using such electronic cards, many connecting contacts between the card and electronic equipment are arranged side by side on part of a card including a printed circuit board (which is referred to hereinafter "PCB"). The power is supplied from the electronic equipment through the connecting contacts to the electronic card. The electronic card is generally so mishandled that it is likely to be dirty and damaged in use, with the result that complete connection cannot be obtained and the electronic equipment is devoid of reliability.

When an electronic card is inserted in an electronic card receiving device of an electronic equipment, ground and power source terminals of the electronic card are connected together with input and output terminals for other signals to the electronic equipment, so that the electronic card performs its operation with the aid of the supplied power. In this case, however, many connecting contacts are seldom connected simultaneously to the equipment. Accordingly, for example, if the power source terminal is first connected and then the ground terminal is connected, contents of the built-in ROM and RAM are often changed or in extreme cases are damaged. Particularly, electronic cards having cells or batteries therein are likely to cause such troubles.

In order to avoid these troubles, it has been proposed to connect the ground terminal first and thereafter the power source terminal when an electronic card is inserted into an electronic card receiving device, and to disconnect the ground terminal finally when the electronic card is removed from the device. However, the power source terminal is often connected before the ground terminal is connected sufficiently, due to unavoidable dirt or damage.

SUMMARY OF THE INVENTION

It is an object of the invention to provide an improved electronic card connecting circuit which is reliable and eliminates all the disadvantages of the prior art above described and which completely prevent a power source from being connected to an electronic card before a ground terminal of the card is earthed.

In order to achieve this object, the electronic card connecting circuit according to the invention comprises first contact means for earthing a ground terminal of an electronic card, second contact means for electrically contacting said ground terminal to detect said ground terminal being earthed by said first contact means, and detection control means including an active element which detects said second contact means being connected through said ground terminal to said first contact means and controls a power source circuit to supply power to said electronic card.

With this arrangement, when the first and second contact pins or contact means are in contact with the ground terminal of the electronic card, in other words, the earthed first contact pin is in contact with the ground terminal of the card and the second contact pin is contact with ground terminal and thus earthed, the control means detects the second contact pin being earthed to produce a control signal to apply power of source to the electronic card. In this manner, the problem that the power source is connected to the card before the ground terminal of the card is earthed can be eliminated.

The invention will be more fully understood by referring to the following detailed specification and claims taken in connection with the appended drawings.

BRIEF DESCRIPTION OF THE DRAWINGS

FIG. 1 is a circuit arrangement illustrating one embodiment of the invention; and FIGS. 2a, 2b and 2c are circuit arrangements illustrating other embodiments of the invention.

DESCRIPTION OF THE PREFERRED EMBODIMENTS

Referring to FIG. 1 illustrating one embodiment of the invention, reference numeral 5 denotes a ground terminal among a number of terminals of an electronic card. Contact pins 6 and 7 of an electronic card receiving device for an electronic equipment are in contact with the ground terminal 5. A circuit shown in FIG. 1 comprises an operational amplifier 10 and resistors 21–24. The operational amplifier 10 has an output terminal 30. A power source is indicated by $+V_B$.

It is assumed that the power source $+V_B$ is of for example +5 V, the resistors 21 and 24 are of for example 100 K$\Omega$ and the resistors 22 and 23 are of for example 1 K$\Omega$.

The contact pin 7 is grounded to an earth of the electronic card receiving device. The contact pin 6 is connected to a junction of the resistors 21 and 22 and to one input terminal of the operational amplifier having a plus sign. An output terminal 30 of the operational amplifier 10 is fedback through the resistor 24 to the other input terminal of the operational amplifier 10 having a minus sign.

When either or both the contact pins 6 and 7 are out of contact with the ground terminal 5, the power source $+V_B$ (+5 V) is divided by the resistors 21 and 22, so that an electric voltage of about 50 mV is applied to one of the input terminals of the operational amplifier, with the result that a voltage of the output terminal 30 is for example approximately 5 V.

When both the contact pins are in contact with the ground terminal 5, the resistor 22 is short-circuited, so that the voltage of one input terminal of the operational amplifier 10 is zero and the voltage of the output terminal 30 is also zero. The voltage of the output terminal 30 is impressed to a power source circuit (not shown) to control the circuit in a manner that when the voltage of the output terminal 30 is about 5 V, the voltage is not impressed to a power source terminal (not shown) of the electronic card, and when the voltage of the output terminal 30 is substantially zero, the voltage is impressed to the power source terminal. Accordingly, the power source voltage is not applied to the power source terminal of the electronic card before the ground terminal 5 has been grounded by means of the contact pin 7. Therefore, an accident such as damage of contents of the electronic card can be prevented.

Referring to FIG. 1, even if only the contact pin 6 is in contact with the ground terminal 5, the voltage of the contact pin is low as approximately 50 mV by which the RAM and ROM of the electronic card are not affected.

Other embodiments according to FIGS. 2a, 2b and 2c will be explained hereinafter.

A circuit shown in FIG. 2a comprises an NPN transistor 11 and resistors 25 and 26 connected as shown in the drawing. It is assumed that a power source voltage $+V_B$ is $+5$ V and the resistors 25 and 26 are of 10 KΩ and 100 KΩ, respectively. Either or both contact pins 6 and 7 are not in contact with a ground terminal 5, a base voltage of the transistor 11 is about 0.7 V, so that the transistor 11 is sufficiently under an ON condition and therefore the voltage of the output terminal 30 is sufficiently low. When both the contact pins 6 and 7 are then brought into contact with the ground terminal 5, the base voltage of the transistor 11 becomes zero, so that the transistor 11 is turned to OFF and the voltage of the output terminal 30 becomes about 5 V. Accordingly, it may be so constructed that only when the voltage of the output terminal 30 is about 5 V, the power source voltage is impressed to the power source terminal of an electronic card.

A circuit shown in FIG. 2b comprises an inverter 12 connected in the circuit shown in the drawing. Only when contact pins 6 and 7 are in contact with a contact terminal 5, an output is obtained at an output terminal 30. Instead of the inverter, a buffer may be used or any one of gates may be used such as NAND, AND, OR and NOR gates.

FIG. 2c illustrates a circuit provided additionally with a protective circuit comprising diodes 18 and 19 connected as shown in the drawing for protecting an inverter 12 when an excess voltage is impressed to an input terminal of the inverter 12.

It should be clearly understood that in case of an electronic card including two or more ground terminals which are short-circuited with each other in the electronic card, the contact pins 6 and 7 may be contacted to separate ground terminals, respectively.

As can be seen from the above description, according to the invention in order to detect the first contact pin being electrically in contact with a ground terminal of an electronic card, the second contact pin is provided. Detection control means is actuated to detect the earthed second contact pin and to produce signals to a power source so as to supply power to the electronic card. The detection control means as an active element may be an operational amplifier, transistor, inverter, buffer or gate. The second contact pin is connected to the input terminal of the active element.

With such an arrangement, any voltage affecting the RAM and ROM of an electronic card is not impressed to the second contact pin. Accordingly, even if only the second contact pin is in contact with a ground terminal of an electronic card, it does not affect the electronic card.

Moreover, with this arrangement, after the ground terminal has been securely earthed by the first contact pin, the power is supplied to the electronic card from a power source. Therefore, the electronic card connecting circuit according to the invention has a significant effect enabling to realize high reliable electronic card receiving devices.

While the invention has been particularly shown and described with reference to preferred embodiments thereof, it will be understood by those skilled in the art that the foregoing and other changes in form and detailes can be made therein without departing from the spirit and scope of the invention.

What is claimed is:

1. An electronic card connecting circuit comprising first contact means earthing a ground terminal of an electronic card, second contact means electrically contacting said ground terminal to detect said ground terminal being earthed by said first contact means, and detection control means including an active element which detects said second contact means being connected through said ground terminal to said first contact means.

2. An electronic card connecting circuit as set forth in claim 1, wherein said active element is an operational amplifier.

3. An electronic card connecting circuit as set forth in claim 2, wherein said circuit comprises two resistors connected in series, one end of one resistor being connected to a power source and one end of the other resistor remote from the one resistor being earthed, a first contact pin as said first contact means being connected through an earthed end of said other resistor and a resistor to one input terminal of said operational amplifier, a second contact pin as said second contact means being connected to a junction of said first mentioned two resistors and to the other input terminal of said operational amplifier, and an output terminal of said operational amplifier being fedback through a resistor to said one input terminal of said operational amplifier.

4. An electronic card connecting circuit as set forth in claim 1, wherein said active element is a transistor.

5. An electronic card connecting circuit as set forth in claim 4, wherein said circuit comprises two resistors connected to a power source, one ends of these resistors remote from the power source being connected to a collector and a base of said transistor, respectively, a first contact pin as said first contact means being earthed and connected to an emitter of said transistor, and a second contact pin as said second contact means being connected to the base of said transistor.

6. An electronic card connecting circuit as set forth in claim 1, wherein said active element is an inverter.

7. An electronic card connecting circuit as set forth in claim 6, further comprising a first contact pin as said first contact means being earthed and a second contact pin as said second contact means being connected to said inverter.

8. An electronic card connecting circuit as set forth in claim 7, further comprising a protective circuit including two diodes.

* * * * *